T. IDE.
AUTOMATIC LIQUID MEASURE AND DISPENSER.
APPLICATION FILED JULY 7, 1914.
1,165,675.
Patented Dec. 28, 1915.
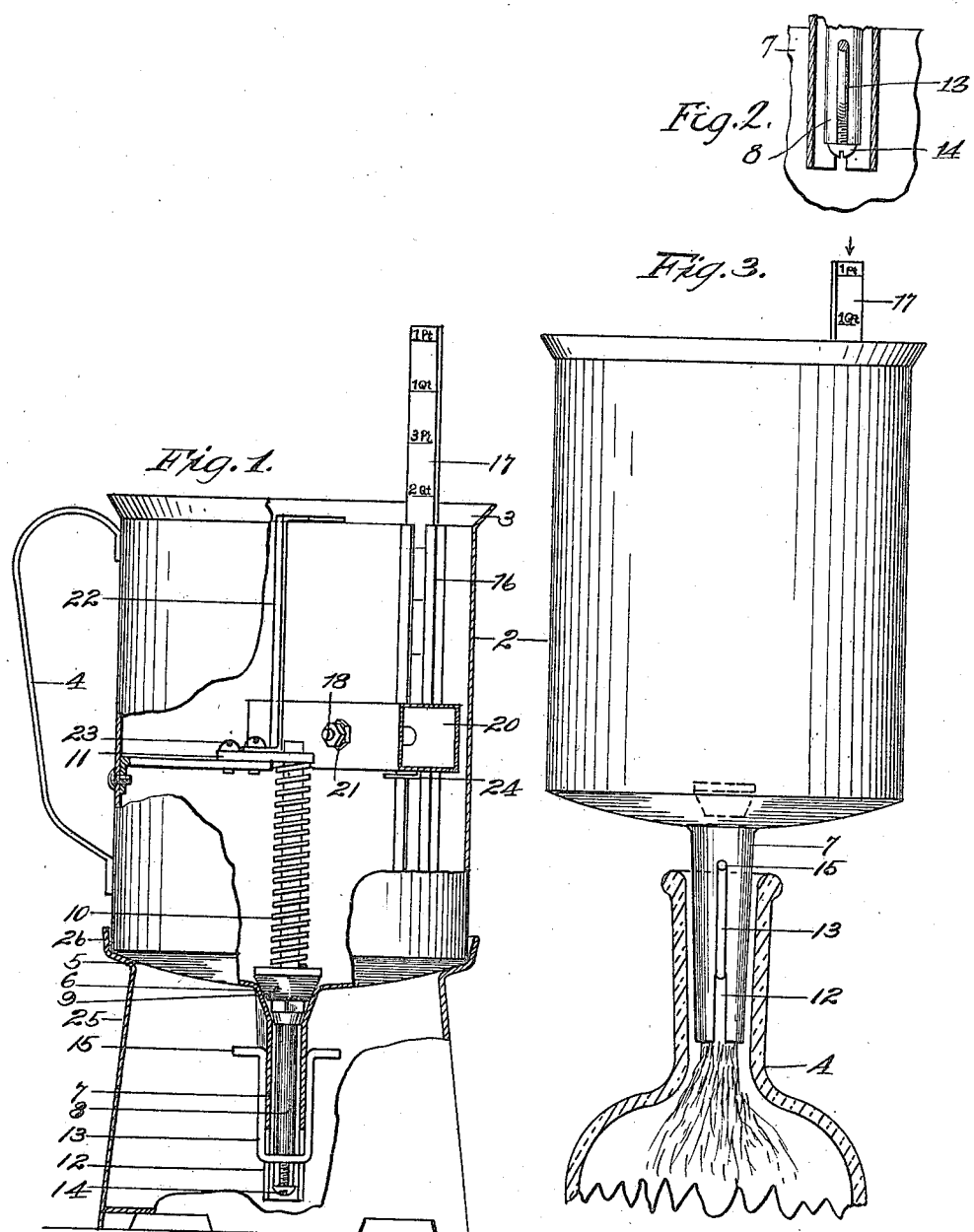

UNITED STATES PATENT OFFICE.

TSUKASA IDE, OF OAKLAND, CALIFORNIA.

AUTOMATIC LIQUID MEASURE AND DISPENSER.

1,165,675.

Specification of Letters Patent.

Patented Dec. 28, 1915.

Application filed July 7, 1914. Serial No. 849,438.

*To all whom it may concern:*

Be it known that I, TSUKASA IDE, a subject of the Emperor of Japan, residing at Oakland, in the county of Alameda and State of California, have invented new and useful Improvements in Automatic Liquid Measures and Dispensers, of which the following is a specification.

This invention relates to liquid measures and has for its object to provide an improved means for mounting the valve actuator or device for effecting opening of the valve, so as to hold the device rigid by use of a single screw.

The invention consists of the parts and the construction and combination of parts as hereinafter more fully described and claimed, having reference to the accompanying drawings, in which—

Figure 1 is a side elevation partly broken away and in section. Fig. 2 is a detailed view partly in section. Fig. 3 is a side elevation of the measure as applied to a bottle and in the dispensing position.

The measure comprises a receptacle 2, open at the top and having a flared mouth 3, and at one side a handle 4. The measure is provided with a concaved bottom 5 having a central valve seat 6 continuing into a tapering discharge nozzle 7, through which projects a valve stem 8 carrying a removable valve washer 9, normally thrust down by a spring 10, surrounding the upper part of the valve stem 8 which is guided in a detachable bearing 11 in the vessel 2.

The lower end of the nozzle 7 is grooved and slotted on opposite sides, as at 12, to provide for the reception and movement of a U-shaped yoke 13, which is detachably connected by a screw 14 to the slotted lower end of the valve stem 8, said screw being threaded in a bore through which the slot of the stem extends. The upper end of the yoke 13 is provided with horizontal, outwardly projecting horns 15 which are adapted, when the measure is adjusted so that the spout 7 enters a bottle to be filled, as A, Fig. 3, to engage and rest upon the mouth of the bottle, and thus, owing to the downward pressure of the filled measure 2 on the spring 10, this will compress and allow the nozzle and seat to leave the valve 9 and allow the contents of the vessel to discharge into the bottle or other device to be filled. Preferably the discharge nozzle 7 of the measure is of tapering form so as to readily enter and fit in the tapering mouths of various sized bottles.

Vertically movable between a suitable guide or guides 16, formed in or attached to the wall of the measure 2, is a gage or indicating bar 17, which is shown in the present embodiment as graduated with pint marks; the lower end of the index bar being provided with a horizontal stem 18 having a shoulder 19. Upon the stem is pivotally mounted a float or other buoyant device 20, prevented from endwise movement on the stem 18 by suitable lock nuts 21, which, when adjusted, provide for a free oscillation of the float 20 on the stem 18.

When the measure receptacle is empty, the float rests upon the bottom of the measure. In use, the operator pours or charges the measure receptacle 2 with the liquid to be measured until the float, which rises with the liquid, actuates the gage or indicator bar 17 vertically in its guide 16 until the desired graduation or scale mark on the gage bar registers with the upper end of the guide 16, or other suitable register mark, at which time the desired quantity of liquid will be contained in the measure receptacle 2. This provides a simple and accurate means for enabling the measuring of liquids, and after the desired quantity of liquid has been poured into the vessel 2 the liquid may be emptied by pouring it out of its mouth 3; or, when a liquid is to be emptied into a convenient vessel or bottle, as A, then the operator, by grasping the handle 4 of the measure 2, inserts the nozzle 7 of the container in the neck of the bottle A and allows the horns 15 of the yoke 13 to rest upon the top of the bottle, whereon the pressure of the weight of the measure and its contents will press down upon the spring 10. The downward movement of the vessel 2, with relation to the valve disk 9, supported by the yoke in a stationary position on the bottle A, will cause the opening or relative movement of the valve from its seat and allow the liquid contents to flow from the measure into the receiving vessel, as the bottle A.

The object of allowing the float 20 to oscillate freely between suitable limits is to prevent the same and the gage bar 17 from binding or clamping during movement. The upward movement of the float and gage bar actuated thereby may be prevented by any suitable means, as by a stop 22, which may be adjustably secured at any suitable position upon the measure receptacle 2 and is here shown as clamped to the detachable bearing 11 by a screw or screws 23.

To limit the degree of oscillation of the float 20 on the pivot member 18 a suitable stop device 24, in the form of an L-shaped plate, Figs. 1 and 2, is attached to the stem 18 so as to engage the bottom of the float 20 after this has moved a predetermined angle in either direction from the horizontal.

For the convenient handling and disposition of the measure or receptacle 2, and to protect its parts against injury or damage, I have provided a suitable pedestal or stand, as 25, having at its upper end a circumferential seat 26, upon which the measure 2 can be deposited; the height of the stand 25 being sufficient to prevent the lower end of the discharge nozzle 7 from touching the bottom of the stand 25.

In the event that the quantity of liquid in the measure 2 is insufficient to automatically compress the spring 10 so as to permit the downward movement of the measure 2, with relation to the valve 9, when its yoke 13 is supported on the bottle A, for instance, then the operator applies just sufficient extra pressure downward, through means of the handle 4, to cause the relative movement of the seat and the valve. As soon as the liquid has been discharged from the measure, the latter may be lifted from the bottle being filled and the spring 10 will automatically close the valve 9 against its seat and the measure is then again ready for use.

Having thus described my invention, what I claim and desire to secure by Letters Patent is—

In combination with a container having a bottom discharge nozzle, the lower end of the nozzle being diametrically slotted, a valve in the nozzle having a relatively thick stem of substantially uniform diameter at its lower end, said stem having its lower end rigid and formed with an interiorly threaded annular central bore and having a diametrical slot which traverses said bore, the upper end of the slot of the stem forming a flat straight transverse wall, a guide yoke of U-form having a straight uninterrupted base which latter engages said wall throughout the length of said wall, said yoke having its upper ends free and turned outwardly to directly engage an extraneous vessel, and a screw threaded into said bore and having its upper end directly engaging the under face of the yoke base to cause the upper face of the latter to be impinged against and rigidly connected to the stem, said screw alone acting to hold the yoke against swinging movement.

In testimony whereof I have hereunto set my hand in the presence of two subscribing witnesses.

TSUKASA IDE.

Witnesses:
F. E. MAYNARD,
JOHN H. HERRING.